Patented Nov. 3, 1931

1,829,843

UNITED STATES PATENT OFFICE

WERNER ZERWECK, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

BROWN VAT DYESTUFFS OF THE ANTHRAQUINONE SERIES

No Drawing. Application filed April 25, 1929, Serial No. 358,161, and in Germany April 28, 1928.

The present invention relates to brown vat dyestuffs of the anthraquinone series, more particularly to dyestuffs corresponding to the following general formula:

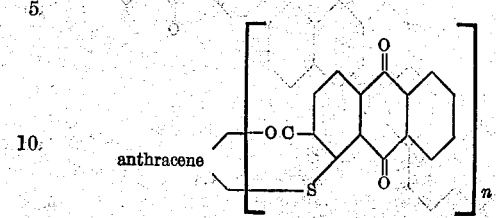

wherein $n$ means the number 1 or 2.

I have found that brown vat dyestuffs are obtained by acting on a mercaptan compound of the anthracene series with an anthraquinone carboxylic acid of the general formula:

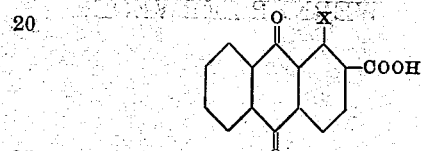

wherein X means halogen, a nitro- or diazo-group, and treating the anthrylthioanthraquinone-2-carboxylic acid thus formed and corresponding to the general formula:

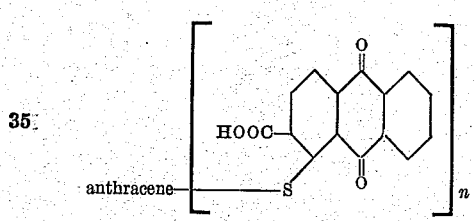

wherein $n$ means the number 1 or 2, with an acid condensing agent. By this reaction at first thio-ethers are formed, which are converted in the second step of my process into the corresponding thio-xanthone compounds. According to this assumption the new dyestuffs correspond to the following general formula:

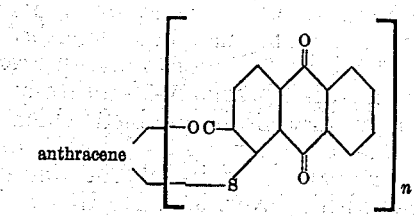

wherein $n$ means the number 1 or 2.

The new dyestuffs produced by my process dye the vegetable fiber valuable yellowish-brown shades of a very good fastness.

In order to further illustrate my invention the following examples are given the parts being by weight and all temperatures in centigrade degrees. But I wish it to be understood that I am not limited to the particular conditions or specific products mentioned therein.

Example 1

21 parts of 2-mercapto-anthracene, prepared, for instance, by reduction of 2-mercapto-anthraquinone, 28,7 parts of 1-chloro-anthraquinone-2-carboxylic acid, 13 parts of potassium hydroxide and 300 parts of water are boiled together under a reflux condenser for several hours while nitrogen is introduced into the mass. Then the reaction mass is diluted with hot water and filtered. The orange colored filtrate is acidified with hydrochloric acid. 1-(2'-anthryl-thio)-anthraquinone-2-carboxylic acid thus separated is filtered off, washed until free from acid and dried. It dissolves in alkalis to orange solutions. The color of its solution in concentrated sulfuric acid is red and becomes quickly brownish-olive.

4.6 parts of this 1-(2'-anthryl-thio)-anthraquinone-2-carboxylic acid are warmed with 3.1 parts of phosphorus pentachloride in 60 parts of trichloro-benzene for about 3 hours on the water-bath. Then the mass is heated to about 200° for still a short time. After cooling the reaction product is filtered off, washed with chloro-benzene and then with acetone and extracted at boiling temperature with a dilute soda solution. The new dyestuff thus obtained corresponds probably to the formula:

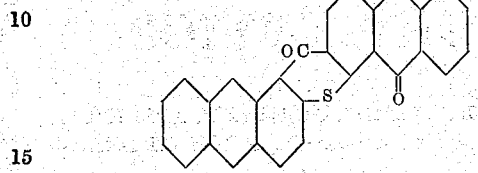

It represents a dark-brown powder soluble in concentrated sulfuric acid with an olive tint and dyes cotton from a green hydrosulfite vat yellowish-brown shades of a good fastness.

*Example 2*

1-chloro-anthraquinone-2-carboxylic acid is condensed in the same manner as described in Example 1 with 2.6-dimercapto-anthracene. Thereby 2.6-di-(2'-carboxy-1'-anthra-quinonyl-thio)-anthracene is obtained which is, when dry, an orange power, soluble in alkalies with an orange tint, in concentrated sulfuric acid with a brownish-olive tint which latter quickly turns to greenish-gray.

15 parts of this dicarboxylic acid are condensed in 240 parts of trichloro-benzene with 12.4 parts of phosphorus pentachloride according to Example 1. The new dyestuff thus obtained corresponds probably to the formula:

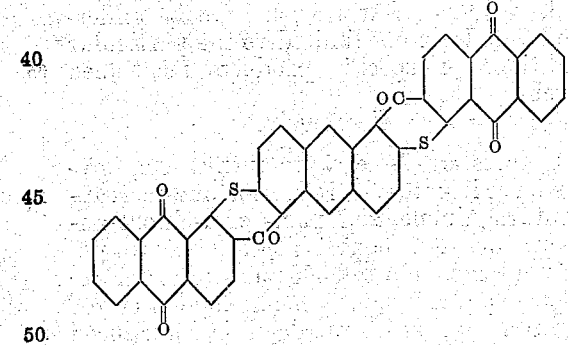

It dissolves in concentrated sulfuric acid with a red color. It yields on cotton from a green warm hydrosulfite vat a full yellowish-brown dyeing of a very good fastness.

I claim:

1. As new products the brown vat dyestuffs of the probable general formula:

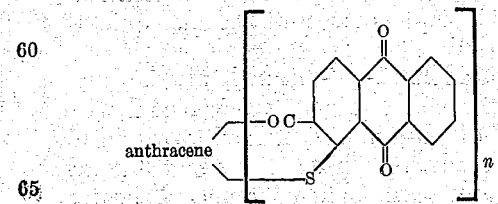

wherein $n$ stands for 1 or 2, which products are when dry dark-brown powders, dyeing the vegetable fiber from a greenish vat brownish shades of a very good fastness.

2. As a new product, the vat dyestuff of the probable formula:

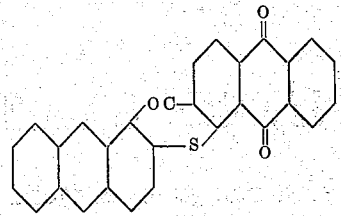

which dyestuffs dissolves in concentrated sulfuric acid with an olive tint and dyes cotton from a green hydro-sulfite vat yellowish-brown shades of a good fastness.

3. As a new product, the vat dyestuff of the probable formula:

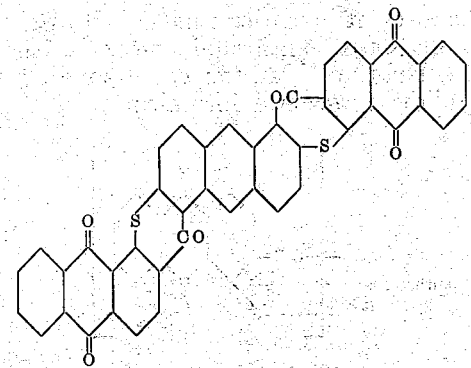

which dyestuff dissolves in concentrated sulfuric acid with a red color and dyes cotton from a green, warm hydrosulfite vat full yellowish-brown shades of a good fastness.

In testimony whereof, I affix my signature.

WERNER ZERWECK.